United States Patent [19]

Tsuzuki et al.

[11] Patent Number: 5,191,359
[45] Date of Patent: Mar. 2, 1993

[54] RECORDING APPARATUS HAVING STEPPING MOTOR STEPPED TO FEED RECORDING MEDIUM IN TIMED RELATION WITH RECORDING ACTION FOR EACH LINE

[75] Inventors: Toshihiro Tsuzuki, Kariya; Kiyoshi Muto, Yokkaichi; Naohisa Kinoshita, Nagoya; Hiroyuki Kashima, Nagoya; Makoto Hasegawa, Nagoya, all of Japan

[73] Assignee: Brother Kogyo Kabushiki Kaisha, Aichi, Japan

[21] Appl. No.: 597,342

[22] Filed: Oct. 15, 1990

[30] Foreign Application Priority Data

Oct. 25, 1989 [JP] Japan .................. 1-277874

[51] Int. Cl.⁵ .......................................... G01D 15/16
[52] U.S. Cl. .......................................... 346/108
[58] Field of Search .............. 346/108, 1.1, 107 R, 346/160

[56] References Cited

U.S. PATENT DOCUMENTS 3,843,917 10/1974 Hoffman .......................... 318/696
4,578,689 3/1986 Spencer et al. ................. 346/108

Primary Examiner—Mark J. Reinhart
Attorney, Agent, or Firm—Oliff & Berridge

[57] ABSTRACT

A recording apparatus including a recording device for recording line of images on a recording medium, and a feeding device having a stepping motor for feeding the recording medium in a feeding direction perpendicular to the recording lines. The apparatus has a signal generator for generating a timing pulse in timed relation with the start of recording of each recording line so that the recording of each line is started in response to the timing pulse. Further, the stepping motor is stepped to feed the recording medium from one line to another, in response to the timing pulse, such that the stepping of the motor from one excitation phase to the next produces an incremental feeding distance of the medium which is equal to 1/n of a line spacing of the recording lines, where n represents a positive natural number.

11 Claims, 4 Drawing Sheets

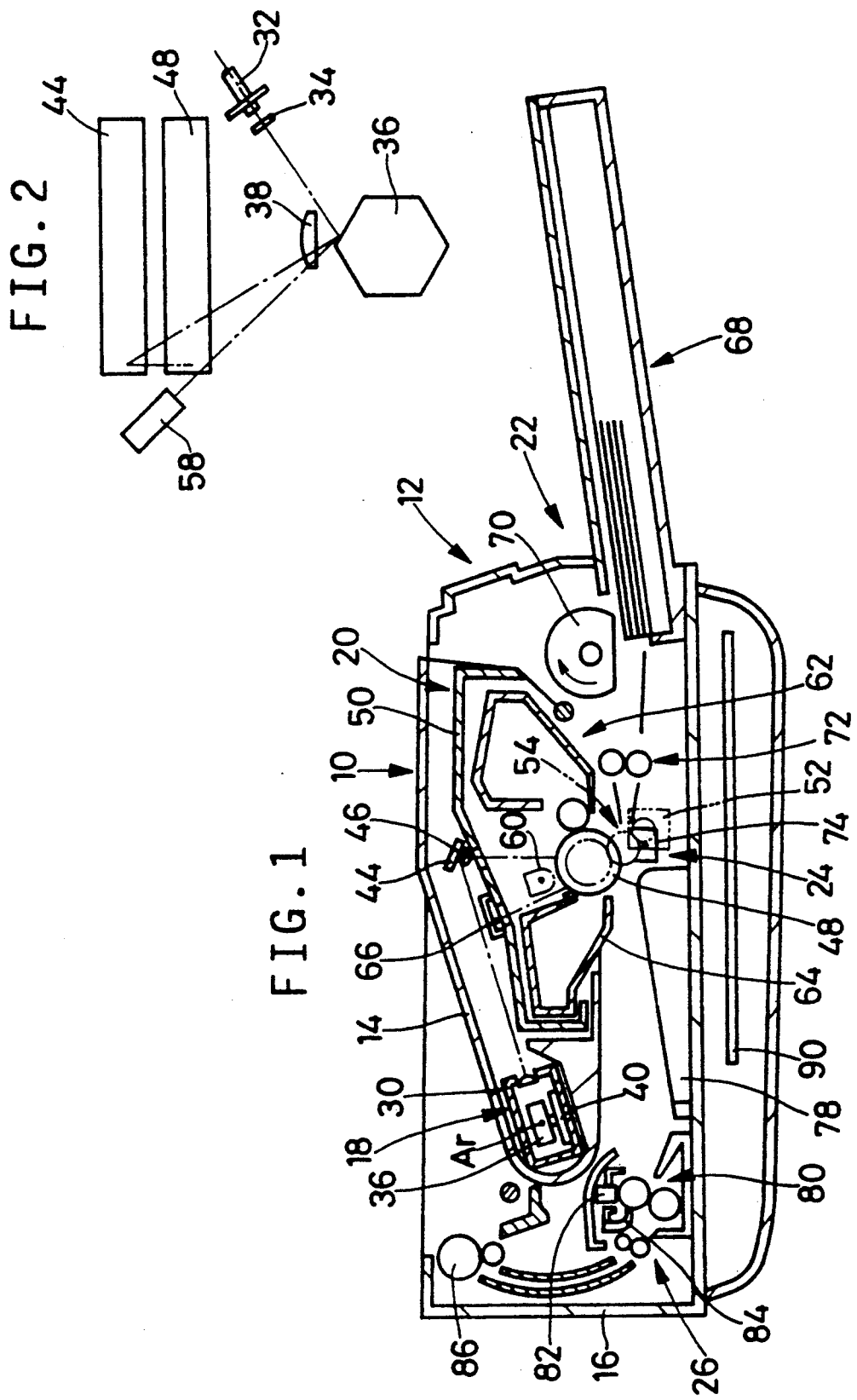

RECORDING APPARATUS HAVING STEPPING MOTOR STEPPED TO FEED RECORDING MEDIUM IN TIMED RELATION WITH RECORDING ACTION FOR EACH LINE

BACKGROUND OF THE INVENTION

1. Field of the Invention

The present invention relates to a recording apparatus, and more specifically to a recording apparatus which uses a stepping motor for feeding a recording medium.

2. Discussion of the Prior Art

A recording apparatus is known, wherein an image is formed on a recording medium, by a multiplicity of parallel recording lines each line defined by a straight row of picture elements which are the smallest parts of the image. This type of recording apparatus includes (a) recording means for effecting a recording operation along each recording line on the recording medium, according to recording data which include bits corresponding to the picture elements arranged in a straight row, (b) feeding means for feeding the recording medium in a feeding direction perpendicular to the recording line, (c) signal generating means for generating a timing pulse at a point of time which has a predetermined time relation with a point of time at which the recording means starts recording along the recording line, and (d) recording control means responsive to the timing pulse, for activating the recording means to start recording along the recording line.

A laser printer is an example of a recording apparatus of the type indicated above. The laser printer has a photoconductive drum as a recording medium, a laser source for generating a laser beam, and a polygon mirror for reflecting and deflecting the laser beam over a predetermined angular range, so that local areas of the surface of the photoconductive drum corresponding to the picture elements of each recording line are scan-exposed to the deflected laser beam. The photoconductive drum is rotated by a predetermined incremental angle during the scan-exposure of each recording line. Thus, a line of latent image represented by the laser beam is formed along each recording line on the surface of the photoconductive drum. This latent image is developed into a corresponding visible image such that a toner is deposited on the selected local areas of the drum surface according to the pattern of the latent image. The visible toner image is then transferred to another recording medium in the form of a cut sheet, for example. For justification of the recording lines at the beginning of recording, a generator is provided as the signal generating means, which is adapted to produce a synchronization pulse in response to which the scanning of each recording line is started to form a line of latent image. Thus, the point at which the image scanning or exposure is started is made constant for all the recording lines.

In a thermal line printer, a heat-sensitive paper containing an inking material which produces a color upon exposure to heat is used as a recording medium, and a multiplicity of heat-generating elements arranged in a straight row are selectively energized to effect printing along each recording line on the recording medium as the recording medium is fed. In this case, the selective energization of the heat-generating elements for each recording line is effected in response to the timing pulse in the form of a line printing command generated by the suitable signal generator.

Where a servomotor is used as a drive source of the feeding means, the recording medium can be fed at a constant speed, permitting a high quality imaging with the line spacing distance kept constant. Recently, however, the servomotor is increasingly replaced by a stepping motor, in view of a relatively high cost of the servomotor and a control system therefor.

On the other hand, the operating speed of a stepping motor tends to vary periodically, due to stepping of the motor from one excitation phase to another. This means an inevitable variation in the feeding speed of the recording medium. For simplification of the control device and reduced cost of the recording apparatus, the stepping motor is usually controlled in an open-loop manner. This open-loop control arrangement causes inconsistent timing of stepping of the stepping motor, also leading to a variation in the feeding speed of the recording medium. The variation in the feeding speed results in an undesirable fluctuation in the line spacing, which deteriorates the quality of an image recorded.

A closed-loop control arrangement using an encoder for stepping the stepping motor in response to a pulse signal generated by the encoder reduces the amount of variation in the feeding speed of the recording medium due to the inconsistent timing of stepping of the motor. However, the closed-loop control arrangement still suffers from the variation in the feeding speed due to the stepping of the motor itself from one excitation phase to the next, and is available at an increased cost as compared with the open-loop control arrangement.

SUMMARY OF THE INVENTION

It is therefore an object of the present invention to provide a relatively inexpensive recording apparatus which uses a stepping motor for feeding a recording medium, and which is substantially free from a variation in the feeding speed, thereby assuring an improved quality of recorded images.

The above object may be accomplished according to the principle of the present invention, which provides a recording apparatus comprising: (a) recording means for effecting a recording operation along a plurality of recording lines on a recording medium, according to recording data, each of the recording lines being defined by a straight row of picture elements, the recording data for each recording line including bits corresponding to the picture elements, respectively; (b) feeding means including a stepping motor, for feeding the recording medium in a feeding direction intersecting the recording lines; (c) signal generating means for generating a timing pulse at a first point of time which has a predetermined time relation with a second point of time at which the recording means starts recording along each recording line; (d) recording control means responsive to the timing pulse, for activating the recording means to start recording along each recording line; and (e) stepping control means responsive to the timing pulse, for stepping the stepping motor to feed the recording medium from one of the recording lines to the next. The feeding means is adapted so that upon stepping of the stepping motor by the stepping control means, the feeding means operates to feed the recording medium such that the stepping of the stepping motor from one excitation phase thereof to the next produces an incremental feeding distance of the recording medium which is equal to 1/n of a line spacing of the recording lines in the feeding direction, where n represents a positive natural number.

In the recording apparatus of the present invention constructed as described above, the stepping of the stepping motor from one excitation phase to the next produces an incremental feed distance of the recording medium which is equal to 1/n of the line spacing distance. According to this arrangement, the recording medium is fed from one recording line to the next, i.e., by the distance equal to the line spacing distance, by energization of the stepping motor in one step or two or more steps whose number is an integer, depending upon the incremental feeding distance corresponding to one step of excitation. Further, the stepping motor is stepped or operated in response to the timing pulse, namely, in a predetermined time relation with the generation of the timing pulse. Accordingly, this arrangement assures a constant operating speed of the stepping motor and therefore a constant feeding speed of the recording medium at the time of the recording operation along each recording line, which recording operation is also started in response to the timing pulse. Although the operating speed of the stepping motor and the feeding speed of the recording medium vary periodically due to the stepping of the stepping motor from one excitation phase to the next, the line spacing can be held constant for any adjacent recording lines, since the timing at which the stepping motor is stepped is constant with respect to the moment of generation of the timing pulse for any recording line.

It is noted that the timing pulse may be a synchronization pulse for determining the moment at which the image scanning for each recording line is started as in a laser printer as described above, or a line printing command for effecting the selective energization of heat-generating elements as in a thermal line printer as also described above. However, the timing pulse is not limited to a signal pulse directly commanding the commencement of the recording operation, but may be any other signal pulse provided that the moment of generation of the pulse has a predetermined relationship with the moment at which the recording operation along each recording line is started or effected.

It will be understood from the above description that the recording apparatus constructed according to the present invention not only permits a constant line spacing, but also is available with a minimum amount of increase in the cost of manufacture, since the timing pulse generated by the signal generator inevitably required for the recording control means for controlling the recording operation is utilized by the stepping control means for controlling the stepping motor.

The incremental feeding distance of the recording medium provided by the stepping motor may be equal to the line spacing. In this case, the stepping control means energizes the stepping motor to effect a single stepping of the motor from one excitation phase to the next, in response to the timing pulse.

Where the recording apparatus takes the form of a printer using an optical scanner unit, the recording medium consists of a photoconductive drum rotatable about an axis parallel to the recording lines. In this case, the feeding means rotates the photoconductive drum in a direction perpendicular to the axis of rotation. The scanner unit may comprise a light source such as a laser source for generating an imaging light beam according to the bits of the recording data corresponding to the picture elements of the recording line, and light deflecting means such as a polygon mirror, for deflecting the imaging light beam over an imaging angular range corresponding to the length of the recording line, so that the surface of the photoconductive drum is exposed to the imaging light beam along each recording line, so as to form a line of latent image along the corresponding recording line.

In the above form of the invention, the light source is preferably adapted to generate also a synchronizing light beam before the imaging light beam is generated. In this instance, the light deflecting means deflects the synchronizing light beam over a synchronizing angular range which precedes the imaging angular range as viewed in the direction of deflection of the beams. According to this arrangement, the signal generating means includes a light detector which is disposed within the synchronizing angular range, for detecting the generation of the synchronizing light beam and generating a synchronization pulse as the timing pulse upon detection of the synchronizing light beam. The light detector may be disposed adjacent to one of opposite ends of a reflecting mirror which reflects the imaging light beam toward the surface of the photoconductive drum.

The principle of the present invention is also applicable to a thermal line printer in which a line of visible image is formed by selective energization of multiple heat-generating elements arranged in a straight row.

BRIEF DESCRIPTION OF THE DRAWINGS

The above and other objects, features and advantages of the present invention will become more apparent by reading the following detailed description of a presently preferred embodiment of the invention, when considered in connection with the accompanying drawings, in which:

FIG. 1 is a front elevational view in cross section of one embodiment of a recording apparatus of the present invention in the form of a laser printer;

FIG. 2 is a plan view of a laser scanner unit used in the laser printer of FIG. 1;

DETAILED DESCRIPTION OF THE PREFERRED EMBODIMENT

Figure 3:
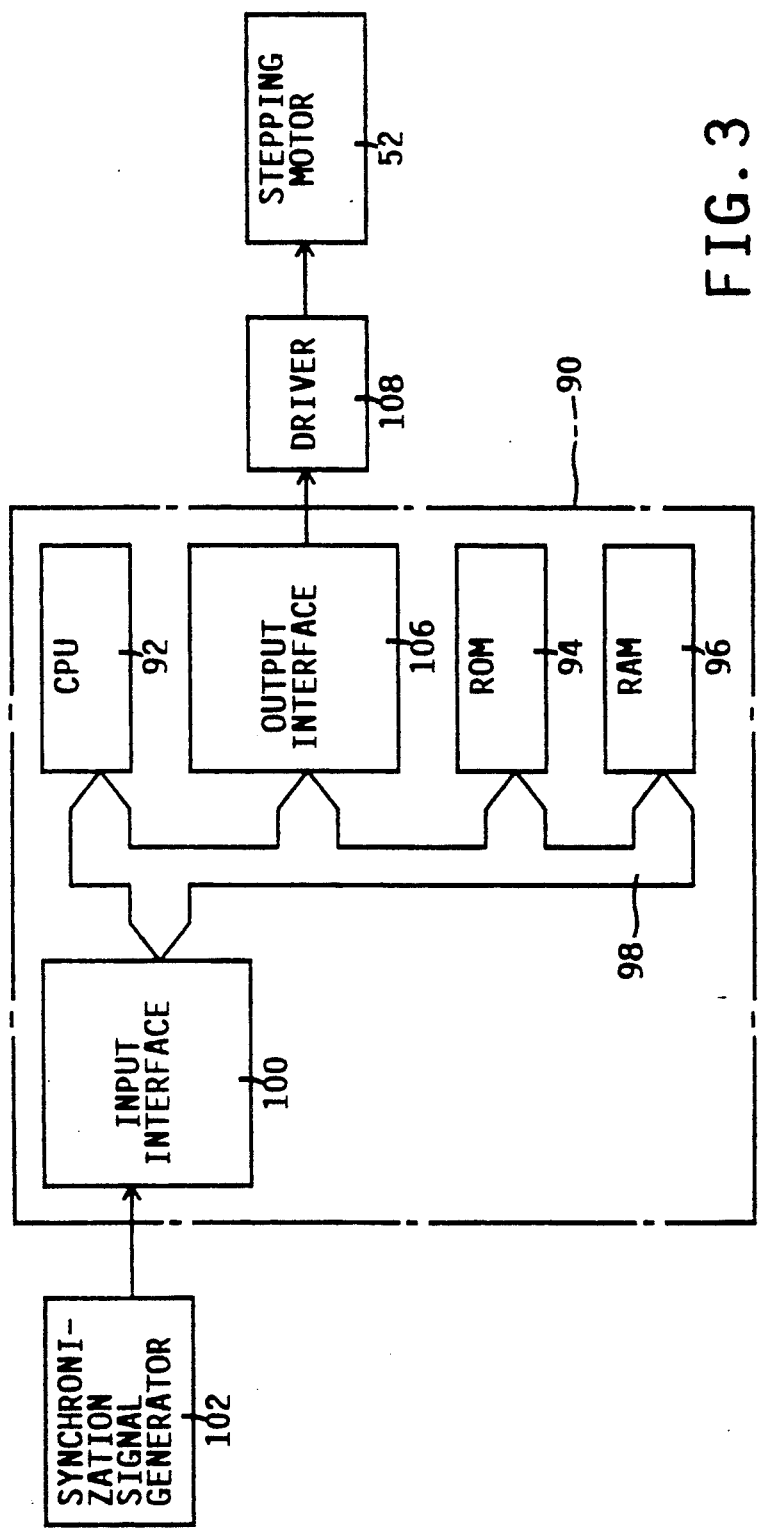
FIG. 3 is a block diagram showing a control system for controlling the laser printer, in particular a stepping motor to feed a recording medium.

Referring first to FIG. 1, the laser printer includes a stationary section 12, and a movable section 10 which is movable relative to the stationary section 12. The movable section 10 has a housing 14 which is supported by a housing 16 of the stationary section 12, pivotally about an axis indicated at Ar. The housing 14 accommodates a laser scanner unit 18. and a process cartridge 20 capable of effecting various process steps for a laser printing operation. The stationary section 12 includes a sheet supply device 22, an image transfer device 24, an image fixing device 26, and other components.

The laser scanner unit 18 has a casing 30 secured to the housing 14. The casing 30 accommodates a semiconductor laser source 32, a collimator lens 34, a polygon mirror 36, and an fθ lens 38, which are disposed as shown in FIG. 2. The polygon mirror 36 is rotated by a drive motor 40, and has six reflecting faces for reflecting an imaging laser beam which is generated by the laser source 32, as described below. As the polygon mirror 36 is rotated, the direction in which the laser beam is reflected by an appropriate one of the six reflecting faces is changed in a plane parallel to the pivot axis Ar of the housing 14, over a predetermined angular range which covers a reflecting mirror 44. The reflecting mirror 44 is attached to the casing 30 such that the mirror 44 extends in the direction parallel to the pivot axis Ar (parallel to the direction of width of the casing 30, which is perpendicular to the plane of FIG. 1). The mirror 44 is spaced a suitable distance from the polygon mirror 36, and the fθ lens 38 is disposed between the polygon mirror 36 and the mirror 44. The imaging laser beam reflected and deflected by the polygon mirror 36 is incident upon the reflecting mirror 44, via the f8 lens 38, such that the beam spot on the mirror 44 is moved along a straight line parallel to the length of the mirror 44, from one end of the mirror 44 to the other end. The imaging laser beam reflected by the mirror 44 is incident through a cylindrical lens 46, upon the surface of a photoconductive drum 48 of the process cartridge 20.

The photoconductive drum 48 supported by a casing 50 of the process cartridge 20, rotatably about an axis parallel to the longitudinal direction of the reflecting mirror 44, i.e., parallel to the pivot axis Ar. The drum 48 is rotated by a stepping motor 52, via a gear train 54. Each time the photoconductive drum 48 is rotated by an incremental angular distance corresponding to a predetermined line spacing between adjacent recording lines, the surface of the photoconductive drum 48 is instantaneously imagewise exposed to the imaging laser beam which is deflected by one of the reflecting faces of the polygon mirror 36, along each recording line, over a predetermined imaging angular range corresponding to the length of the recording line (length of the drum 48). More specifically, as the polygon mirror 36 is rotated to imagewise scan each recording line with the imaging laser beam, the semiconductor laser source 32 is turned on or off according to image bits of recording data which represent the presence or absence of dots at the respective picture elements arranged in a straight row along each recording line. With this image scanning along each recording line repeatedly implemented as the drum 48 is fed, lines of latent image represented by a batch of recording data are formed on the surface of the drum 48. As described above, the thus formed latent image is developed into a visible image on another recording medium in the form of a recording paper.

In the present embodiment, the drum 48 serves as a recording medium on which a latent image is formed as a result of imagewise scanning by the imaging laser beam, and the laser scanner unit 18 and mirror 44 provide recording means for forming the latent image on the recording medium 48. The stepping motor 52 and the gear train 54 provide feeding means for feeding the recording medium 48 (for rotating the photoconductive drum 48).

The stepping motor 52 has four excitation phases A, B, C and D, and is of a simultaneous one phase excitation type. That is, the motor 52 is stepped with the four phases A-D sequentially established. To feed the drum 48 from one recording line to the next, the stepping motor 52 is operated by one step, and the gear train 54 is adapted such that the one step operation of the motor 52 with the phase changed from one phase to the next produces an incremental feeding distance (incremental angle of rotation) of the drum 48 equal to the line spacing between adjacent recording lines (scanning lines).

The semiconductor laser source 32 generates a synchronizing laser beam before generating the imaging laser beam described above. This synchronizing laser beam is also deflected by the polygon mirror 36 over a synchronizing angular range which is comparatively smaller than the imaging angular range and which precedes the imaging angular range. In other words, the synchronizing laser beam is initially generated for a comparatively short period of time before the imaging laser beam is subsequently generated for a comparatively long period of time to scan the entire length of the reflecting mirror 44 in the predetermined scanning direction, i.e., in the rightward direction as viewed in FIG. 2.

Adjacent to the left-hand side end of the reflecting mirror 44 as viewed in FIG. 2, there is disposed a light detector 58 such that the light detector 58 is positioned in the middle of the synchronizing angular range over which the synchronizing laser beam is deflected by the initial rotation of the polygon mirror 36. The light detector 58 detects the synchronizing laser beam and generates a synchronization pulse, before the imaging laser beam is generated by the laser source 42 and deflected by the polygon mirror 36. Thus, the synchronization pulse is generated an extremely short time before the photoconductive drum 48 is imagewise exposed to the imaging laser beam along each recording line.

The process cartridge 20 incorporating the photoconductive drum 48 also includes a charger 60, a developing device 62 for developing the formed latent image, and a cleaner 64. Before the photoconductive drum 48 is imagewise exposed to the imaging laser beam reflected by the mirror 44, the surface of the drum 48 is subjected to a pre-exposing operation by a pre-exposing lamp 66 provided in the movable section 10, for removing the residual electrostatic charge, and is then electrostatically evenly charged by the charger 60. After the drum 48 is subjected to the selective imagewise local exposure to the imaging laser beam, a toner is applied to the selected local areas of the drum surface by the developing device 62, whereby the latent image is developed into a corresponding visible image defined by a pattern of the toner. The visible toner image is then transferred to the recording paper delivered from a sheet cassette 68 of the sheet supply device 22, and the residual toner remaining on the drum surface is removed by the cleaner 64. Thus, the laser scanner unit 18, mirror 44, charger 60, developing device 62, cleaner 64, and pre-exposing lamp 66 provide recording means for recording a visible image.

The process cartridge 20 is removably received in the housing 14 of the movable section 10. To remove the cartridge 20, the housing 14 is first pivoted about the pivot axis Ar in the upward direction, and the cartridge 20 with the casing 50 is pulled out of the casing 14. Thus, the photoconductive drum 48 of the removed cartridge 20 may be cleaned or replaced by new one.

The sheet supply device 20 is attached to the housing 16 of the stationary section 12 of the printer, and the sheet cassette 68 stores the recording paper in the form of a stack of cut sheets. The cut sheets are delivered one after another by a pick-up roll 70, and are fed to the image transfer device 24 through registering rolls 72, which adjust the timing at which each cut sheet is passed between the photoconductive drum 48 and an image transfer charger 74 of the image transfer device 24. The cut sheet is fed at the same speed as the rotating speed of the drum 48, by utilizing the stepping motor 52 as a drive source. As the cut sheet is fed past the image transfer charger 72, the toner is transferred from the surface of the drum 48 to the cut sheet electrostatically charged by the charger 74. In this manner, the visible toner image represented by the recording data is eventually formed on the cut sheet. The cut sheet bearing the visible image is fed toward the image fixing device 26, while being guided by a guide 78. The image fixing device 26 includes a pair of fixing rolls 80, a cleaner 82 and a separator 84. The cut sheet leaving the fixing device 26 is fed out of the printer by ejection rolls 86.

A control device 90 for controlling the laser printer is disposed in a lower part of the housing 16 of the stationary section 12, as indicated in FIG. 1. A major portion of the control device 90 is constituted by a computer which includes a central processing unit (CPU) 92, a read-only memory (ROM) 94, a random-access memory (RAM) 96, and a bus 98 connecting these elements, as illustrated in FIG. 3. The bus 98 is connected to an input interface 100 which receives a timing pulse from a synchronization signal generator 102. The generator 102 generates the timing pulse when the light detector 58 generates the synchronization pulse upon detection of the synchronization laser beam. The light detector 58 and the signal generator 102 cooperate to constitute signal generating means for generating the timing pulse in predetermined timed relation with the moment at which the drum 48 is imagewise exposed to the imaging laser beam along each recording line.

The timing pulse is generated by the signal generator 102 at a predetermined constant time interval, since the synchronization pulse is generated by the light detector 58 a predetermined short time before the left end of the reflecting mirror 44 receives the imaging laser beam reflected by the polygon mirror 36, and since the polygon mirror 36 is rotated at an accurately controlled constant speed.

The bus 98 is also connected to an output interface 106 which in turn is connected to the stepping motor 52 through a driver 108.

In the laser printer constructed as described above, the semiconductor laser source 32 is activated to generate the imaging laser beam in response to the timing pulse received from the signal generator 102, i.e., a predetermined short time after the generation of the synchronization pulse from the light detector 58, which occurs upon detection of the synchronizing laser beam previously generated by the laser source 32 for each recording line. Accordingly, the left end of the mirror 44 at which the imaging laser beam is initially focused can be made constant for all the recording lines, whereby the lines of latent image formed on the photoconductive drum 48 can be accurately justified at the left end of the recording lines. Further, the spacing between the adjacent lines of latent images on the drum 48 can be made constant, since the stepping motor 52 is operated to shift the excitation phase by one step in response to each timing pulse, and since the feeding distance of the drum 48 obtained by the one step operation of the motor 52 is equal to the predetermined line spacing.

Figure 5:
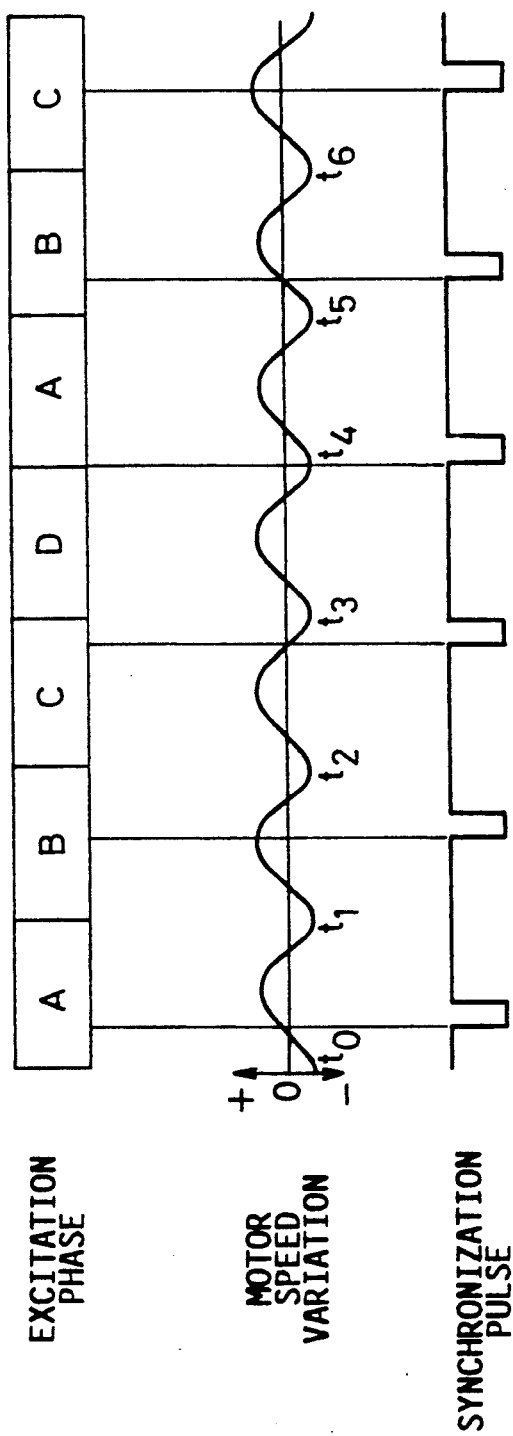
FIG. 5 is a timing chart similar to that of FIG. 4, illustrating the relationship in the known laser printer.

If the incremental feeding distance of the drum 52 obtained by one stepping or energizing operation of the motor 52 is not equal to the line spacing, and if the stepping operation is effected independently of the timing pulse, the operating speed of the motor 52 upon generation of the timing pulse (synchronization pulse) for one recording line differs from that for another recording line, as indicated in FIG. 5, thereby causing a variation in the feeding speed (rotating speed) of the photoconductive drum 48 for the different recording lines along which the drum surface is imagewise exposed to the imaging laser beam. In this case, the adjacent lines of latent image formed on the drum surface overlap each other or are spaced apart from each other by an excessive distance, whereby the quality of the visible image developed from the latent image is lowered.

Figure 4:
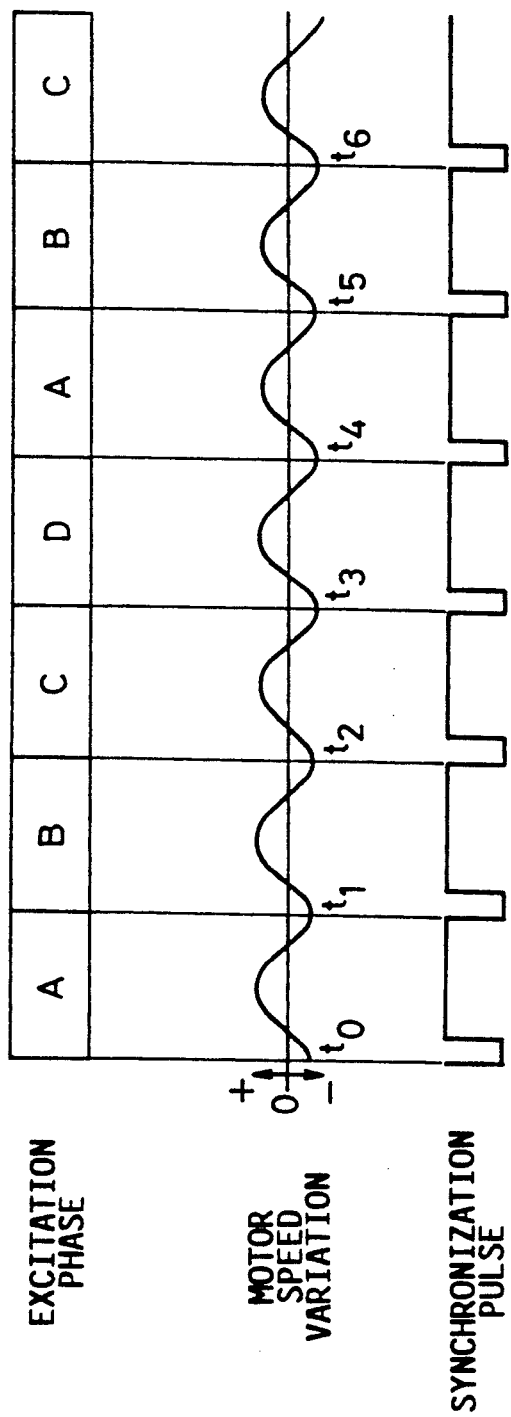
FIG. 4 is a timing chart illustrating a relationship among synchronization pulses, excitation phases of the stepping motor, and operating speed of the stepping motor (feeding speed of the recording medium), in the laser printer of FIG. 1.

In the laser printer, however, both the stepping operation of the motor 52 and the generation of the imaging laser beam by the laser source 32 are effected in timed relation with the generation of the timing pulse or synchronization pulse, and the feeding distance of the drum 48 is equal to the predetermined line spacing. Therefore, the operating speed of the stepping motor 52 at the time of generation of each synchronization pulse is constant, as indicated in FIG. 4, although the operating speed of the motor 52 varies periodically due to the stepping operations of the motor 52. Accordingly, the present laser printer permits printing with improved image quality, with the constant line spacing.

It will be understood from the above explanation that the CPU 92 and the ROM 94 serve as recording control means for controlling the semiconductor laser source 32 to generate the imaging laser beam, based on the timing pulse received from the signal generating means 58, 102, while at the same time serve as stepping control means for stepping the stepping motor 52, in response to the timing or synchronization pulse, to feed (rotate) the photoconductive drum 48 by a predetermined incremental feeding distance corresponding to the line spacing.

While the illustrated embodiment is adapted such that the incremental feeding distance of the drum 48 obtained by the stepping of the motor 52 from one excitation phase to the next is equal to the predetermined line spacing between the adjacent recording lines, the principle of the present invention may be practiced even when the incremental feeding distance is otherwise determined, provided that the incremental feeding distance is equal to 1/n of the line spacing, where n is a positive natural number.

In the illustrated embodiment, the stepping motor 52 is connected to the photoconductive drum 48 via the gear train 54, the motor 52 may be connected directly to the drum 48. In this case, the rotating angle of the rotor of the stepping motor 52 obtained by one step energization thereof is equal to the rotating angle of the drum 48, and the motor 52 is therefore adapted such that the rotating angle of the drum 48 obtained by the one step energization of the motor corresponds to the line spacing.

While the illustrated embodiment is adapted such that the toner applied to the imagewise exposed surface of the drum 48 is transferred to a recording cut sheet, a light-sensitive recording paper may be exposed to the imaging laser beam so that a visible image is directly formed on the recording paper. In this case, the recording paper is the recording medium which is fed by the stepping motor 52 in response to the timing pulse according to the principle of the present invention.

The present invention is also applicable to a thermal line printer wherein heat-generating elements arranged in a straight row are selective energized at one time to form a line of visible image on a heat-sensitive recording medium. In this case, the stepping motor for feeding the recording medium is stepped in response to a line printing command which initiates the selectively energization of the heat-generating elements for each recording line.

While the present invention has been described in its presently preferred embodiment with a certain degree of particularity, it is to be understood that the invention is not limited to the details of the illustrated embodiment, but may be embodied with various changes, modifications and improvements, which may occur to those skilled in the art, without departing from the spirit and scope of the invention defined in the following claims.

What is claimed is:

1. A recording apparatus comprising:
    recording means for effecting a recording operation along a plurality of recording lines on a recording medium, according to recording data, each of said recording lines being defined by a straight row of picture elements, said recording data for said each recording line including bits corresponding to said picture elements, respectively;
    a feeding member for feeding said recording medium in a feeding direction intersecting said recording lines;
    a stepping motor operable in steps for continuously producing a rotary motion;
    a power transmission mechanism for transmitting the rotary motion of said stepping motor to said feeding member such that each step of operation of said stepping motor from one excitation phase thereof to a next excitation phase thereof produces an incremental feeding distance of said recording medium, said incremental feeding distance being equal to 1/n of a line spacing of said recording lines in said feeding direction, where n represents a positive natural number;
    signal generating means for generating a timing pulse at a first point of time which has a predetermined time relation with a second point of time at which said recording means starts recording along said each recording line, such that the recording along said each recording line is effected while the recording medium is continuously fed;
    recording control means responsive to said timing pulse, for activating said recording means to start recording along said each recording line; and
    stepping control means responsive to said timing pulse, for operating said stepping motor by at least one step, to feed said recording medium from one of said recording lines to the next recording line, such that the operation of said stepping motor in said at least one step is started in a predetermined timed relation with respect to said first point of time.

2. The recording apparatus according to claim 1, wherein said power transmission mechanism transmits said rotary motion of said stepping motor to said feeding ember such that said incremental feeding distance is equal to said line spacing, and said stepping control means energizes said stepping motor to effect a single stepping of the stepping motor from the one excitation phase to the next excitation phase, in response to said timing pulse generated by said signal generating means.

3. The recording apparatus according to claim 1, wherein said recording medium consists of a photoconductive drum supported rotatably about an axis of rotation, said axis of rotation being parallel to said recording lines, and said feeding ember rotates said photoconductive drum in a feeding direction which is perpendicular to said axis of rotation.

4. The recording apparatus according to claim 3, wherein said recording means includes a scanner unit which comprises a light source for generating an imaging light beam according to said bits of said recording data for said each recording line, and light deflecting means for deflecting said imaging light beam over an imaging angular range corresponding to a length of said each recording line, so that a surface of said photoconductive drum is exposed to said imaging light beam along said each recording line, to form a line of latent image along said each recording line.

5. A recording apparatus comprising:
    a photoconductive drum supported rotatably about an axis of rotation thereof;
    recording means for effecting a recording operation along a plurality of recording lines on said photoconductive drum, according to recording data, each of said recording lines being parallel to said axis of rotation of said drum and defined by a straight row of picture elements, said recording data for said each recording line including bits corresponding to said picture elements, respectively;
    said recording means including a scanner unit which comprises a light source for generating an imaging light beam according to said bits of said recording data for said each recording line, and light deflecting means for deflecting said imaging light beam over an imaging angular range corresponding to a length of said each recording line, so that a surface of said photoconductive drum is exposed to said imaging light beam along said each recording line, to form a line of latent image along said each recording line;
    said light source further generating a synchronizing light beam before generating said imaging light beam, and said light deflecting means deflecting said synchronizing light beam over a synchronizing angular range which precedes said imaging angular range as viewed in a direction of deflection of said imaging and synchronizing light beams by said light deflecting means;
    feeding means including a stepping motor, for rotating said photoconductive drum about said axis of rotation;
    signal generating means comprising a light detector disposed within said synchronizing angular range, for detecting the generation of said synchronizing light beam and generating a synchronization pulse upon detection of said synchronizing light beam a predetermined time before generation of said imaging light beam;
    recording control means responsive to said synchronization pulse, for controlling said scanner unit to start exposing said surface of said photoconductive drum to said imaging light beam for said each recording line, at a point of time said predetermined time after the generation of said synchronization pulse; and
    stepping control means responsive to said synchronization pulse, for stepping said stepping motor to rotate said photoconductive drum from one of said recording lines to a next one of said recording lines said predetermined time after the generation of said synchronization pulse, such that the stepping of said stepping motor from one excitation phase thereof to a next excitation phase thereof produces an incremental angle of rotation of said photoconductive drum which corresponds to $1/n$ of a line spacing of said recording lines in a direction perpendicular to said recording lines, where n represents a positive natural number.

6. The recording apparatus according to claim 5, wherein said recording means further includes a reflecting mirror disposed between said light deflecting means and said photoconductive drum, for reflecting said imaging light beam toward said photoconductive drum, said light detector being disposed adjacent to one of opposite ends of said reflecting mirror as viewed in said direction of deflection of said imaging and synchronization light beams.

7. The recording apparatus according to claim 5, wherein said light source comprises a laser light source for generating an imaging laser beam.

8. The recording apparatus according to claim 5, wherein said light deflecting means comprises a polygon mirror for deflecting said imaging light beam over said imaging angular range.

9. The recording apparatus according to claim 5, wherein said recording means further includes a developing device for developing said line of latent image into a line of visible image.

10. The recording apparatus according to claim 9, wherein said developing device deposits a toner to said surface of said photoconductive drum, in a pattern corresponding to said latent image.

11. The recording apparatus according to claim 9, further comprising image transfer means for transferring the pattern of said toner to another recording medium.

* * * * *